(12) United States Patent
Ames et al.

(10) Patent No.: US 11,700,222 B1
(45) Date of Patent: *Jul. 11, 2023

(54) SYSTEM ARCHITECTURE FOR MESSAGE TRANSPORTATION MANAGEMENT

(71) Applicant: WHAT IF MEDIA GROUP, LLC, Fort Lee, NJ (US)

(72) Inventors: Craig Ames, Los Angeles, CA (US); Agustín Beamurguía, Buenos Aires (AR); Lautaro Nahuel De León, Buenos Aires (AR)

(73) Assignee: WHAT IF MEDIA GROUP, LLC, Fort Lee, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,012

(22) Filed: Sep. 19, 2022

Related U.S. Application Data

(63) Continuation of application No. 17/741,280, filed on May 10, 2022, now Pat. No. 11,451,502.

(51) Int. Cl.
*H04L 51/212* (2022.01)
*H04L 51/216* (2022.01)
*H04L 51/42* (2022.01)

(52) U.S. Cl.
CPC .......... *H04L 51/212* (2022.05); *H04L 51/216* (2022.05); *H04L 51/42* (2022.05)

(58) Field of Classification Search
CPC ...... H04L 51/212; H04L 51/216; H04L 51/42
See application file for complete search history.

(56) References Cited

U.S. PATENT DOCUMENTS 9,258,269 B1 * 2/2016 Ashley .................. H04L 51/212
11,070,511 B2 * 7/2021 O'Brien .................. H04L 51/18

FOREIGN PATENT DOCUMENTS

WO WO 2005/119488 A2 12/2005
WO WO-2005119488 A2 * 12/2005 ........... H04L 12/585

* cited by examiner

*Primary Examiner* — Austin J Moreau
(74) *Attorney, Agent, or Firm* — Knobbe, Martens, Olson & Bear, LLP

(57) ABSTRACT

A message transportation management system can be configured to receive a message directed to a plurality of target message recipients. The system can determine a plurality of levels of activity, each corresponding to one of the plurality of target message recipients. The system can receive a level of activity threshold associated with each of the plurality of target message recipients. The system can determine that the first subgroup of target message recipients qualifies as priority target message recipients. The system can transmit, via a priority transfer location, the message to the first subgroup of target message recipients and transmit, via a default transfer location different from the priority transfer location, the message to a second subgroup of target message recipients.

20 Claims, 11 Drawing Sheets

400

404 → Accept a set of email content/destination pairs

408 → Obtain viewed data for previous emails in the set to establish a visibility score for each content/destination pair 412 → Provide at least two separate channels each having a unique delivery probability parameter measured empirically from past use of that channel 416 → Establish a jetstream comprising a condition grouping that allocates each member of the set to one of the at least two separate channels

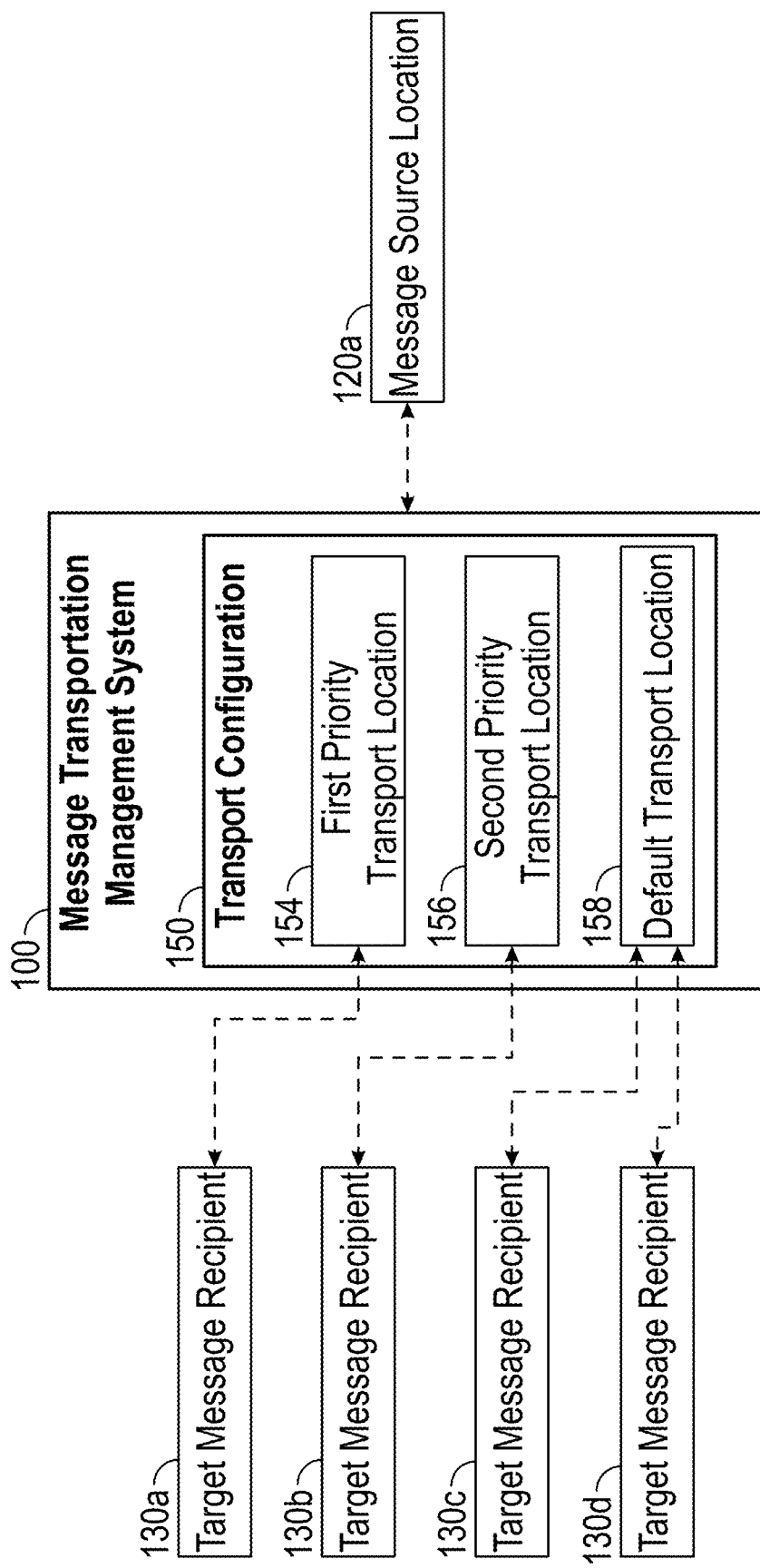

Transport Configuration   Transport Configuration Name
Details

200

204 — Jetstream Name A

Source Pool*

208 — IP Pool D

Target Pool*

212 — IP Pool A

Start time (UTC)*

216 — December 13, 2021-09:35 AM

End Time (UTC)*

220 — October 07, 2022-0530 AM

Maximum Emails Alloted * 3808
224

Auto Update Jetstream (Yes ◯)

Maximum Emails Per Campaign

ⓘ The Volume Will be updated at: Thu, 20 Jan 2022 17:45-51-0500

Update at [02:00 AI] (UTC) Every  24 hours ⌄

◯ Duplicate Maximum Emails ⊙ Update try percentage [1]

Reset Configuration if maximum emails value is not met?  (Yes ◯)

Transport Configuration Details

Last Opened
254 — 7 days

Last Clicked
258

Include Account IDs

Exclude Account IDs
262 — 33311,23312,23313,23314,23464,23465,23595,23672,23707,23706,23895,23955,23956,
24103,24191,24192,24340,24341,24447,24448,26016,26575,26576,26792,26793,26794,269...

Email Providers
266 — Yahoo.com ⊖

Search domains...     Collapse Domain Selector ˅

270 — aol.com
asu.edu
atanticbb.net
all.net

Add All ⊞ Remove All

Categories
xx ⊖ | xx ˅ | Charity ⊖ | Education ⊖

Search Categries...     Collapse Category Selector ˅

274 — Adult
Business
Charity ˅
Education ˅

Add All ⊞ Remove All

FIG. 2B

SYSTEM ARCHITECTURE FOR MESSAGE TRANSPORTATION MANAGEMENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Sending messages among computing devices has become commonplace. With the increased transmission of message, computing devices have developed methods for filtering those messages based on one or more criteria. For example, many modern email services provide easy ways for users to ignore or even miss emails that may have various levels of importance or urgency. Such filtering solutions, however, have created countervailing problems related to ensuring that important messages are received and reviewed by the recipient. Modern approaches are limited in how they can properly determine which messages should be prioritized by a recipient.

BRIEF DESCRIPTION OF THE DRAWINGS

FIG. 1B shows a block diagram of an example message source location can send a plurality of messages via a plurality of transport locations of the message transportation management system.

FIG. 2A shows an example portion of a transport configuration user interface that can be used to create or modify a transport configuration.

FIG. 2B shows a transport configuration condition user interface, which may be another aspect of the transport configuration user interface of FIG. 2A.

DETAILED DESCRIPTION

Terms

Figure 1A:
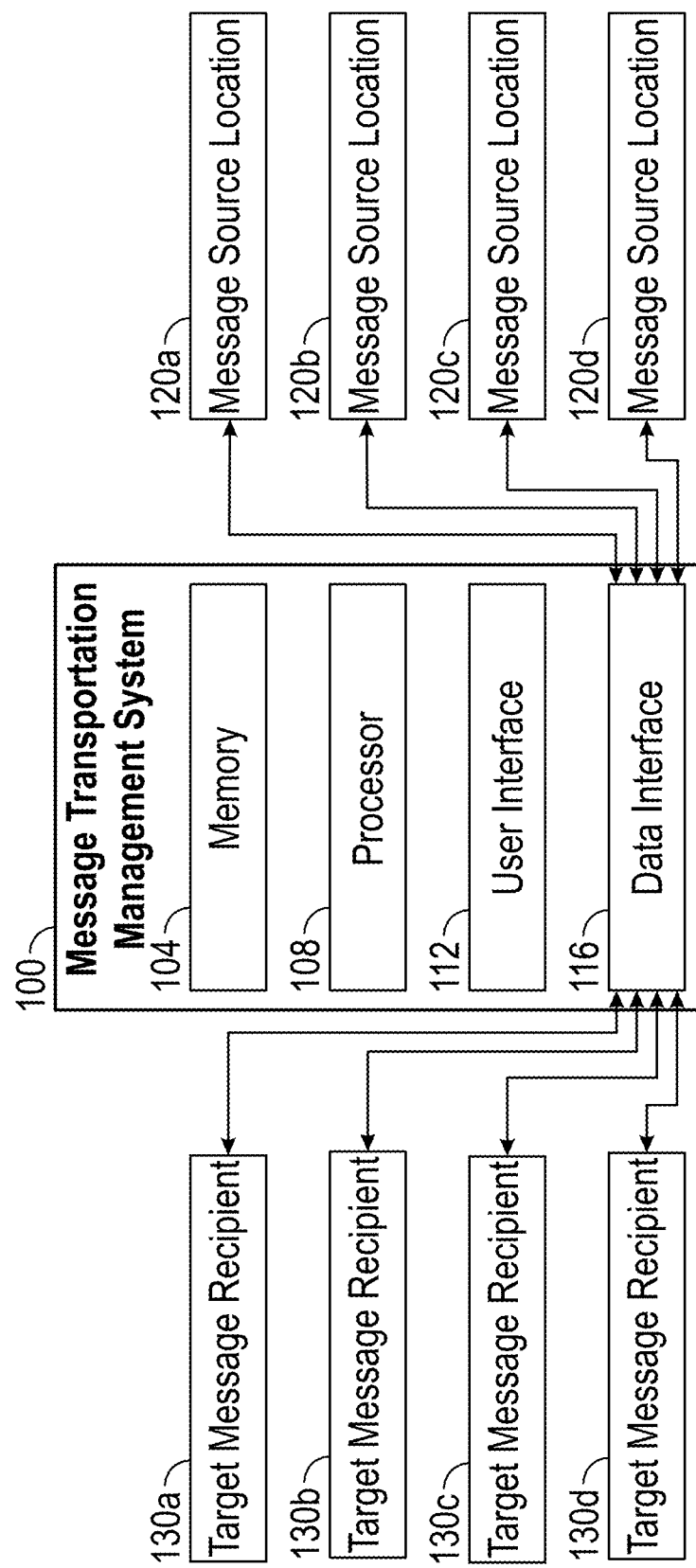
FIG. 1A shows an example message transportation management system that receives one or more messages from one or more message source locations and sends the one or more messages to one or more target message recipients.

In order to facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms. Thus, the descriptions below do not limit the meaning of these terms, but only provide exemplary descriptions.

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Message: Any electronic form of communication that includes an intended sender and an intended receiver/recipient. The message's attributes (e.g. metadata about the message) may be represented in one or more properties. Attributes may include, for example, an internet protocol (IP) address or other identifier associated with an intended sender or receiver, a size of the message or portion of the message, a time associated with send or receipt of the message, an IP address or other identifier associated with an intermediary (e.g., a transport location), and so forth. Some non-limiting examples of messages include emails, SMS messaging, MMS messaging, push notifications, chat messaging, and any other electronic form of communication.

Metadata: Any data about a message. Such data can include descriptive, structural, administrative, reference, statistical, and/or legal data associated with the message. Metadata can include attributes of the message, such as an IP address or other identifier associated with an intended sender or receiver, a size of the message or portion of the message, a time associated with send or receipt of the message, an IP address or other identifier associated with an intermediary (e.g., a transport location).

Message Source Location: Any sending computing system or other originator of a message. A message source location may be associated with a message source identifier, which can identify at least in part a message source location. An example message source location includes a server location, an "SMTP From Address" (e.g., sender email address), a phone number, an IP address, an email domain, or some other electronic source location. A single computing system or computing device may be associated with a plurality of message source locations. Additionally or alternatively, a single message source location can be associated with a plurality of computing systems or computing devices.

Transport Location: Any message intermediary, such as a message intermediate location, that is different from the message source location. A transport location can be associated with one or more computing systems or computing devices. A message can have one or more transport locations. A transport location can be associated with a "From address" different from an "SMTP From Address". A transport location can be associated with one or more IP addresses and/or domains (e.g., email domains).

Level of Activity: Any measurable or otherwise describable degree of participation, engagement, or receipt by a message recipient/receiver with one or more messages, which can include previously received messages. A level of activity can reflect a level of how often, how quickly, in how much depth, or other relevant factor that a recipient interacts with messages. Relevant messages for purposes of level of activity can be narrowed by one or more factors, such as a message's subject-matter category or other factor. Levels of activity may relate to openings of a message, clicks on an email, opening attachments of the message, activating a link within a message, etc.

Recipient: Any receiver of a message. May be used in place of receiver in some cases. A recipient generally refers to an electronic recipient (e.g., an email address, an email server, an email domain, etc.) but may sometimes refer to a human user at a client device viewing the message.

Overview

Modern messaging services focus much of their resources on reducing the amount of messages that a user will see or interact with. Often, these services over-filter and prevent users from receiving critical or urgent messages. Criteria for filtering such messages are often unknown to a user, and sometimes even finding or retrieving filtered messages can be difficult or impossible. Many modern email services provide easy ways for users to ignore or even miss emails that may have various levels of importance or urgency. These filtering algorithms create difficulties for recipients and for senders alike by disrupting basic needs of communicating with others, including among large groups of senders and recipients, often by complicating how messages are sent, stored, retrieved, opened, and interacted with. Thus, modern approaches are limited in how they can properly send and deliver messages among senders and recipients.

Embodiments described herein can solve some of these issues. Message transportation management systems described herein can better help messages that need to be seen and opened be seen and opened, while also allowing other messages to be properly filtered, thus reducing the amount of messages that are improperly filtered out.

Whether a recipient or receiver (these terms may generally be used interchangeably unless otherwise specified) prioritizes an incoming message for display for view by a user (e.g., not filtered out, not relegated to a separate folder such as a "spam" folder or "junk" folder or similar) can be based on one or more factors. One factor that can influence the priority a message receives by a recipient is a reputation score of the incoming message. The reputation score may be based on one or more factors, such as a message source location, a transport location, an affinity score between the recipient and the message source location and/or the transport location, metadata associated with the message, and/or other factors. A reputation score can be dynamic or static. Dynamic reputation scores may be improved by an increase in a level of activity associated with messages that have a same or similar message source location, transport location, subject matter category, content, metadata, or other relevant similarity. Often a reputation score is set by a recipient (e.g., Gmail, Yahoo Mail, Outlook, etc.) and may not be public or otherwise knowable by a sender or intermediary.

Knowing the reputation score may be helpful to a sender or intermediary for obtaining feedback about the potential impact future messages may have on the reputation score of the sender/intermediary and, therefore, a likelihood that future messages will have a higher level of activity. Message transportation management systems described herein may be configured to create one or more message transport configurations to help ensure that high-priority message has an increased chance of being viewed or interacted with. A transport configuration can be a set of thresholds and/or protocols that determine which messages will be sent via a priority transport location, a level of priority of the priority transport location, and/or which messages will be sent via a default transport location. A transport configuration can be arranged to target an improved reputation and/or affinity score with the sender and/or intermediary. A transport configuration may be referred to as a "jetstream".

A priority transport location can be a transport location that is associated with a high reputation score. Because reputation scores are often unknowable to the public, a message transportation management system can estimate a reputation score. Thus, in some embodiments the priority transport location may only be able to estimate the reputation score associated therewith. A transport configuration may be selective about which messages are sent via a priority transport location in order to protect and/or enhance a high estimated reputation score of the priority transport location. A default transport location may be a transport location that does not enjoy the same high level of reputation score (or estimated reputation score) as a priority transport location.

Determinations about whether a message will be sent via a priority transport location or a default transport location may be dynamic. For example, messages from a first message source location may initially be sent from a default transport location and, after a showing of marked improvement in the level of activity associated with those message, may over time be shifted to being sent via a priority transport location. Additionally or alternatively, messages from a second message source location may initially be sent from a priority transport location may have a low level of activity that hurts a reputation score associated with messages from the second source. In response, the message transportation management system may determine that future messages from the second message source location should be sent via a default transport location. This change may be in order to protect a reputation score of the priority transport location and/or of the second message source location.

A reputation score may further be based on additional factors, such as a category of subject matter associated with the messages from a message source location, a category of the message source location itself, and/or other factor. Such factors may increase the complexity associated with a transport configuration of the message transportation management system. For example, the message transportation management system may determine that a first plurality of messages related to a first subject matter (e.g., fishing) from a message source location should be sent via a priority transport location while a second plurality of messages related to a second subject matter (e.g., arts) from the same message source location should be sent via a default transport location. The various permutations of the possible transport configurations are so great as not to be individually described here.

Reference will now be made to the figures. FIG. 1A shows an example message transportation management system 100 that receives one or more messages from one or more message source locations 120a-d and sends the one or more messages to one or more target message recipients 130a-d. The message transportation management system 100 can send the one or more messages to the target message recipients 130a-d. The messages from the message source locations 120a-d may be sent via one or more transport locations, as described herein (e.g., with respect to FIG. 1B below).

The message transportation management system 100 can include a memory 104, a processor 108, a user interface 112, and/or a data interface 116. The memory 104 can include one or more non-transitory computer readable storage media having program instructions embodied therewith. The instructions can be configured, when executed by the processor 108, to perform actions described herein. The processor 108 can include one or more electronic computer processors configured to execute the instructions embodied on the memory 104.

The user interface 112 can be configured to receive user input and/or provide output to a user. Example user interfaces are described herein, such as with respect to FIGS. 2A-2B. The user interface 112 can be implemented via an electronic device that includes a display and one or more buttons, switches, dials, capacitive touch interfaces, or touchscreen interfaces. In certain embodiments, at least a portion of the user interface is implemented via an electronic device separate from the message transportation management system 100. In some embodiments, the user interface 112 includes a computer display and/or a display of a mobile device (e.g., smartphone).

The data interface 116 can be configured to interact with data received from message source locations and/or data transmitted to recipients. The data interface 116 can include a wired data interface and/or a wireless data interface. The data interface may refer to a plurality of data interfaces. In some examples, each data interface of the plurality of data interfaces is configured to communicate with a different electronic device.

FIG. 1B shows a block diagram of an example message source location 120a that can send a plurality of messages via a plurality of transport locations of the message transportation management system 100. The message transportation management system 100 can include can include one or more transport configurations 150, which may include data (e.g., protocols, thresholds, etc.) stored on the memory 104. The transport configuration 150 shown in FIG. 1B includes a first priority transport location 154, a second priority transport location 156, and a default transport location 158. Other configurations are possible. The transport configuration 150 is shown only by way of example.

The message transportation management system 100 can receive the plurality of messages transmitted by the message source location 120a. The message transportation management system 100 may determine, using the transport configuration 150, which messages are to be sent via the first priority transport location 154, which are to be sent via the second priority transport location 156, and which are to be sent via the default transport location 158. The determination of each of these may be based on one or more factors. The one or more factors may be determined at least in part by a user input into the user interface 112. For example, a user may specify a threshold reputation score, a threshold affinity score, a threshold level of activity (e.g., when previous message was last opened, when previous message was last clicked, a recipient average click rate, a recipient average open rate, a recipient average bounce rate, a recipient average spam rate, etc.), a domain from a pool of target domains, a category of message subject matter from a pool of target message subject matter, a category of domain from a pool of target category of domains, a recipient rating score, a maximum volume of sent messages (e.g., daily max, weekly max, etc.) or other factor described herein.

Figure 1C:
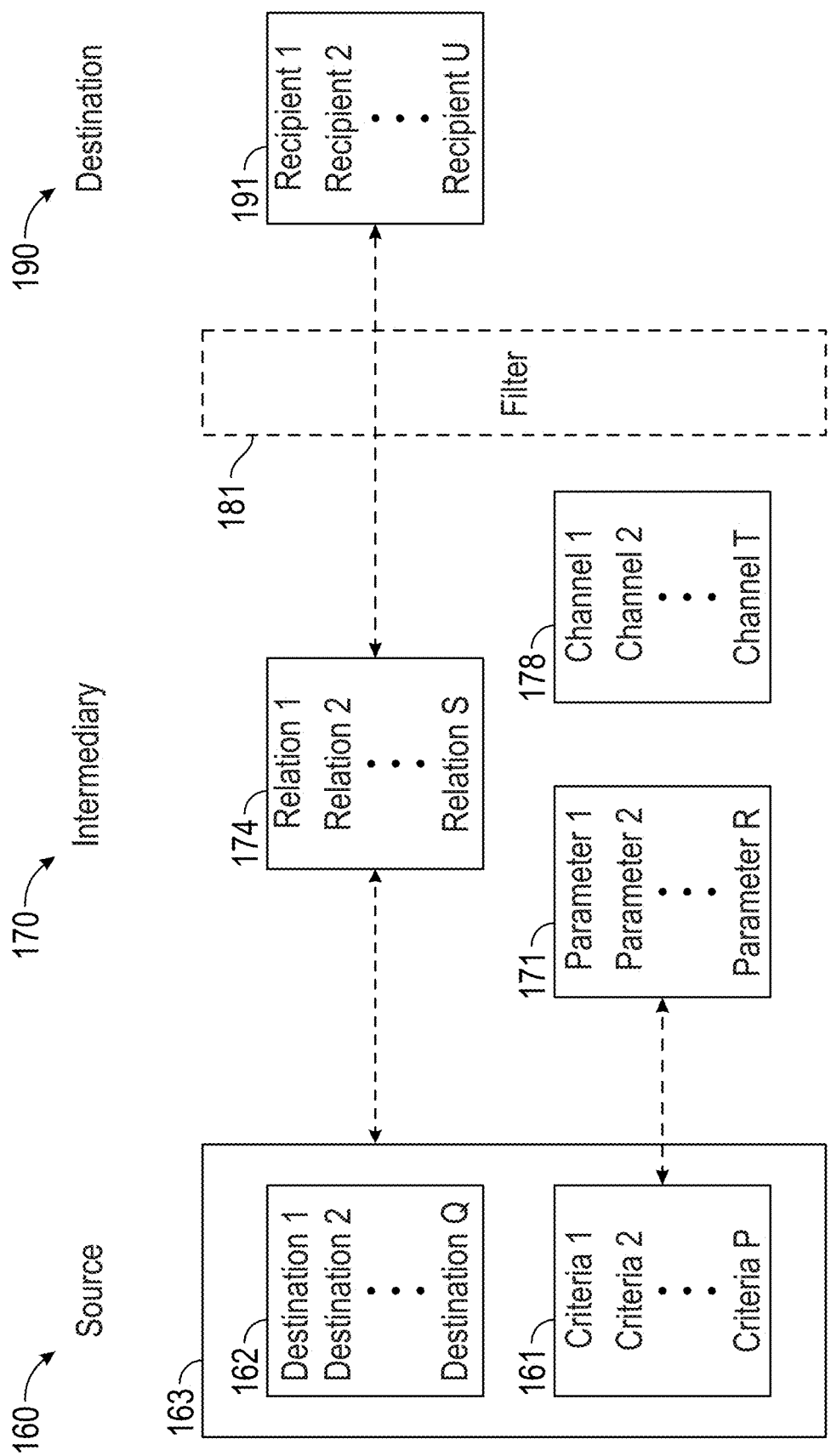
FIG. 1C illustrates an example system for carrying out disclosed methods.

FIG. 1C illustrates an example system for carrying out disclosed methods. A source 160 can provide a set of messages 163 each having characteristics 161. The characteristics can include various criteria 1, 2 . . . P, which may include the identity of the source 160. The source 160 can also provide a set of destinations 162 (which may be associated or a part of the messages 163) to an intermediary 170. The intermediary 170 can establish or receive a set of relations 174 that associate the source 160 (and or previous messages form the source 160) with recipients 191, illustrated here in a set of destinations 190. The relations 174 can be empirically determined based on how quickly or readily a recipient 191 viewed or otherwise interacted with previous messages (e.g., from the intermediary 170 and/or the source 160). For example, such relation data can be obtained from previous messages sent by source 160 or by intermediary 170. This data can be generated by including a downloadable pointer object or other message marker in messages, for example, that communicates or establishes contact with a server at the source 160 or intermediary 170. In some embodiments the relations 174 can reflect affinity, or likelihood of the various recipients 191 (e.g., recipients 1, 2 . . . U) to be interested in messages from the source 160, interested in one or more of the criteria 161, or likelihood of those recipients 191 to receive such messages given the presence of a filter 181.

A user interface 171 can include parameters 1, 2, . . . R that correspond to one or more of the characteristics 161, including various criteria 1, 2, . . . P. The user interface 4171 can include controls for a user to enter additional parameters as well, for example, corresponding to those illustrated in FIGS. 2A and 2B. And intermediary 170 can include a jetstream system 178 having channels 1, 2 . . . T.

FIG. 1C can be used to describe methods consistent with this disclosure. For example, after receiving a message from source 160 having destination 162 and criteria 161, and user of an intermediary 170 can select from the characteristics 161 to establish operating parameters in a user interface 171. These parameters can designate at least two of the channels 178 in the jet stream system of the intermediary 170. Existing channels can reflect the results of previous messages (even if such messages did not originate with the source 160 or include any of the specific recipients 191). Thus, some channels can be allocated to higher likelihood transmissions and others to lower likelihood transmissions. Channels can include domains, IP addresses, or other indicators used by filter providers to establish reputations or affinity scores, for example. A user can use the interface 171 to select from the channels 178 (in the interface 171) for given messages having certain criteria 161 to improve the likelihood messages having a higher predicted affinity for recipients 191 will be opened by the intended recipients 191 and reflect an accurate relation 174 and/or accurate interest by the recipient 191 in one or more of criteria 161. They can also be selected to improve the likelihood of being passed through a filter 181. Both of these goals can be achieved by assigning predicted high success destination/criteria/recipient groups to historically high success channels, and assigning predicted lower success destination/criteria/recipient groups to historically lower success channels. For example, channel 1 may be used for a subset of destinations 162 that have a more trusted relation 174 with a set of recipients 191. Channel 2 may be used for a subset of destinations 162 that have a less trusted relation 174 with a set of recipients 191. The trust level can be determined based on engagement, affinity, specific activity levels, empirical data gathered from previous messages, etc. An intermediary can receive feedback to evaluate whether allocating messages between channels one and two was successful in predicting the resulting level of engagement affinity for those messages by the recipients 191.

FIG. 2A shows an example portion of a transport configuration user interface 200 that can be used to create or modify a transport configuration. The transport configuration user interface 200 may correspond to the user interface 112 of FIGS. 1A-1B in some embodiments. The transport configuration user interface 200 can include one or more fields that allow for user input of corresponding subject matter. For example, the transport configuration user interface 200 can include a transport configuration name selector 204, a default transport location selector 208, a priority transport location selector 212, a transport configuration start time selector 216, a transport configuration end time selector 220, and/or message allotment selector 224. One or more of these selectors may be selectable by a user to input the relevant data. In some embodiments, certain of these selectors may include default data that may or may not be updateable by a user.

The transport configuration name selector 204 can allow a user to select and/or modify a transport configuration name. The transport configuration name may include details related to one or more of the message source location and/or the target recipient(s).

The default transport location selector 208 can be selected to identify one or more default transport locations. A default transport location can include one or more IP addresses and/or domain names. The priority transport location selector 212 can identify one or more priority transport locations. A priority transport location can include one or more IP addresses and/or domain names. Although a single default transport location and priority transport location are shown in FIG. 2A, one or both may include a plurality of respective transport locations. Additionally or alternatively, each transport location may have corresponding criteria/thresholds for determining whether messages are to be sent via the corresponding transport location.

A user may be able to select a start time and/or end time using the respective transport configuration start time selector 216 and/or transport configuration end time selector 220. The start time and end time can constitute a target time window. The target time window may refer to when the message transportation management system will determine whether the one or more thresholds are satisfied. Additionally or alternatively, the target time window may refer to when messages are to be received and/or sent by the message transportation management system. The message allotment selector 224 can refer to a maximum amount of messages that may be sent from a particular transport configuration over a particular time frame (e.g., over a day, over a week, over a year, over the existence of the transport configuration, etc.). In some embodiments, a user may be able to select a minimum number of messages that must be submitted by a particular transport location (e.g., a priority transport location).

FIG. 2B shows a transport configuration condition user interface 250, which may be another aspect of the transport configuration user interface 200. The transport configuration condition user interface 250 can include a last-opened threshold selector 254, a last-clicked threshold selector 258, a message source identifier inclusion selector 262, a message source identifier exclusion selector 266, a message recipient identifier selector 270, a recipient category selector 274, and/or other selectors.

The last-opened threshold selector 254 can allow a user to select a threshold time to identify recipients that have opened messages from a target location within the threshold time. The target location may include the message source location, a transport location, target recipient location, and/ or some other message location. For example, in some embodiments opening a message within the threshold time would correspond to opening the message in a window of time extending into the past by an amount of the threshold time. The threshold time may be dynamic or static, and/or the threshold time may be conditional. For example, a user may select a threshold time for a first time period and/or first set of messages, and select a different threshold time for a second time period and/or second set of messages. In some embodiments, the system may automatically determine a threshold time based on the message source location or some other factor described herein. Additionally or alternatively, the user may set the threshold time to be based on a subset of recipients (e.g., associated with a domain name, etc.), on a category of subject matter associated with the messages, a category of recipient, and/or some other factor described herein.

A message may be include a message tag, linking object, pointing object, or some other signaling object or message marker that can identify when a message has been opened, clicked on/within, and/or experienced other engagement activity at a target recipient (e.g., by an end user). The message tag can include an image object (e.g., a pixel), a hyperlink, or some other object that causes the target recipient to transmit a signal to a remote computing device associated with the message source location that the message has experienced the corresponding engagement activity. For example, in response to a user opening an email, an image object may need to be downloaded from a remote server. This downloading can be traced and recorded as engagement activity with the email.

The last-clicked threshold selector 258 can allow a user to select a threshold time for recipients that have clicked on and/or within messages from a target location within the threshold time. In some embodiments, clicking on or within a message may correspond to a user selection of a link or other selector within the message. Additionally or alternatively, opening a message may be different from clicking on the message. For example, in some cases (e.g., based on a user interface setting of a target recipient, on the target recipient itself, or on some other factor) a user may be able to select (e.g., click on) a message without opening it. This may allow a user, for example, to view some or all of the contents of the message without triggering conditional logic of the message that requires the message to be opened. Although the last-opened threshold selector 254 and the last-clicked threshold selector 258 refer to opening and clicking on an email, other kinds of messages and other kinds of engagement or interaction activity by a user can be included additionally or alternatively. The last-clicked threshold selector 258 may have one or more other features of the last-opened threshold selector 254 described above.

The message source identifier inclusion selector 262 can allow a user to select a set of target locations (e.g., message source location, transport location, recipient location, etc.) to be associated with (e.g., included in) the message. For example, a user may select a list of IP addresses associated with a message source location whose emails should be governed by the transport configuration. The message source identifier exclusion selector 266 can allow a user to select a set of target locations to be excluded or otherwise disassociated with the message. The message source location inclusion and/or exclusion data may not be visible on a message or its associated metadata but may instead govern how a message is treated by the transport configuration.

The message identifier selector 270 can allow a user to select one or more identifiers (e.g., domain name, SMTP From, From, etc.) associated with a message source location, a transport location, a target recipient, and/or some other location. For example, as shown in FIG. 2B, the user has selected yahoo.com as a condition for allowable target message recipients for any message sent via the transport configuration created by the transport configuration condition user interface 250.

A user may additionally or alternatively be able to select one or more categories via the category selector 274. The categories may relate to a message source location, a transport location, a target recipient, and/or any other location. The category can describe a message content type, a sender type, and/or a recipient type. In some embodiments, the category can further restrict how the last-opened and/or last-clicked thresholds are determined. For example, target recipients who have opened some messages from the message source location within the threshold time may nevertheless not receive messages via the transport configuration of FIG. 2B if the target recipient has not opened any messages having the particular subject matter content. Accordingly, the category selector 274 can be used to refine the transport configuration in one of many ways. As shown in FIG. 2B, a user has used the category selector 274 to select Charity and Education categories as sender types.

As shown in FIG. 2B, the last-opened threshold selector 254, the last-clicked threshold selector 258, and the message identifier selector 270 can be used by a user to specify details related to target recipients. The message source identifier inclusion selector 262, the message source identifier exclusion selector 266, and the category selector 274 can be used to specify details related to the message source location.

Figure 3:
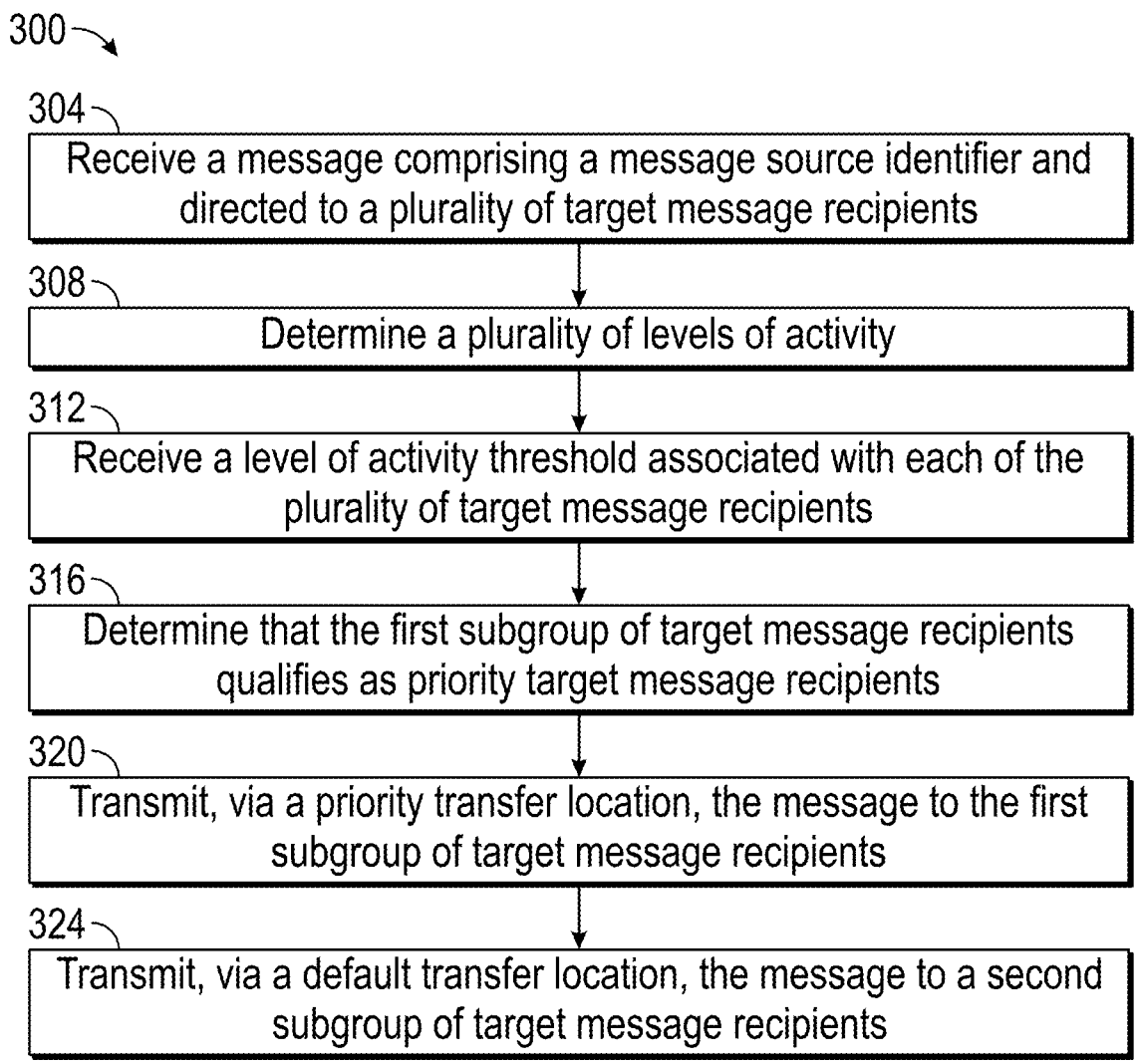
FIG. 3 shows an example method that may be performed by a message transportation management system to determine that a first subgroup of target message recipients qualifies as priority target message recipients.

FIG. 3 shows an example method 300 that may be performed by a message transportation management system to determine that a first subgroup of target message recipients qualifies as priority target message recipients. The message transportation management system may be any message transportation management system or other system described herein. At block 304 the system can receive a message directed to a plurality of target message recipients. The system may receive the message from a message source location. At block 308, the system can determine a plurality of levels of activity. The levels of activity can each corresponding to one of the plurality of target message recipients and may be based on the message source location and/or on the plurality of target message recipients. Determining the levels of activity may include determining an average level, a median level, a mode level, or some other aggregation of level of activity for each of the target message recipients. Additionally or alternatively, the level of activity may correspond to a recent level of activity. What constitutes "recent" may be determined by a user (e.g., via a user interface described herein). As noted above, the level of activity may relate to whether the target message recipient has engaged with (e.g., opened, clicked within, clicked on, etc.) a message from either the message source location, the priority transport location, or the default transport location within a particular time window or a message that fits another criteria described herein.

At block 312 the system can receive (e.g., via a user interface) a level of activity threshold associated with each of the plurality of target message recipients. The system may then determine that the first subgroup of target message recipients qualifies as priority target message recipients. The determination may be based on the plurality of levels of activity, on the level of activity threshold, and/or based on another factor or criteria described herein. The determination may be essentially in real-time and/or may be determined for one or more customers and/or customer campaigns. As noted above, this determination may be based on a "reputation score", which can influence initial categorization of the transport location and can influence future categorization of future emails from the message source location and/or to the target destination.

At block 316 the system can transmit the message to a second subgroup of target message recipients via a default transport location different from the priority transport location. The first and second subgroups may not share any common target message recipients with each other.

The system may receive from each of the plurality of target message recipients an indication of a respective level of activity. This may be done via a tag or other object (e.g., signaling object, linking object, pointing object, etc.) as described above. Additionally or alternatively, the system may be able to determine (e.g., via user identification, automatically) a category for each of the plurality of target message recipients. The system may be able to determine a level of activity (e.g., engagement, participation) for message associated with a particular category.

In some embodiments, the system can identify or estimate an affinity score associated with the plurality of target message recipients and/or with the message source location. The affinity score may related to a likelihood of a message from a sender being received (e.g., not blocked, not sent to spam or junk folders, etc.) by the recipient and being viewable by a recipient user. In some embodiments, the system receives the affinity score(s) from a user and/or from a recipient database. Additionally or alternatively, the system may estimate an affinity score by tracking an engagement level of previous emails from a message source location (e.g., emails sent from the message source location without an intermediary such as a transport location).

In some embodiments, the system can receive (e.g., via a user interface) one or more message recipient identifiers. Transmission of the message to different groups of target message recipients may be based at least in part on the one or more message recipient identifiers.

Figure 4:
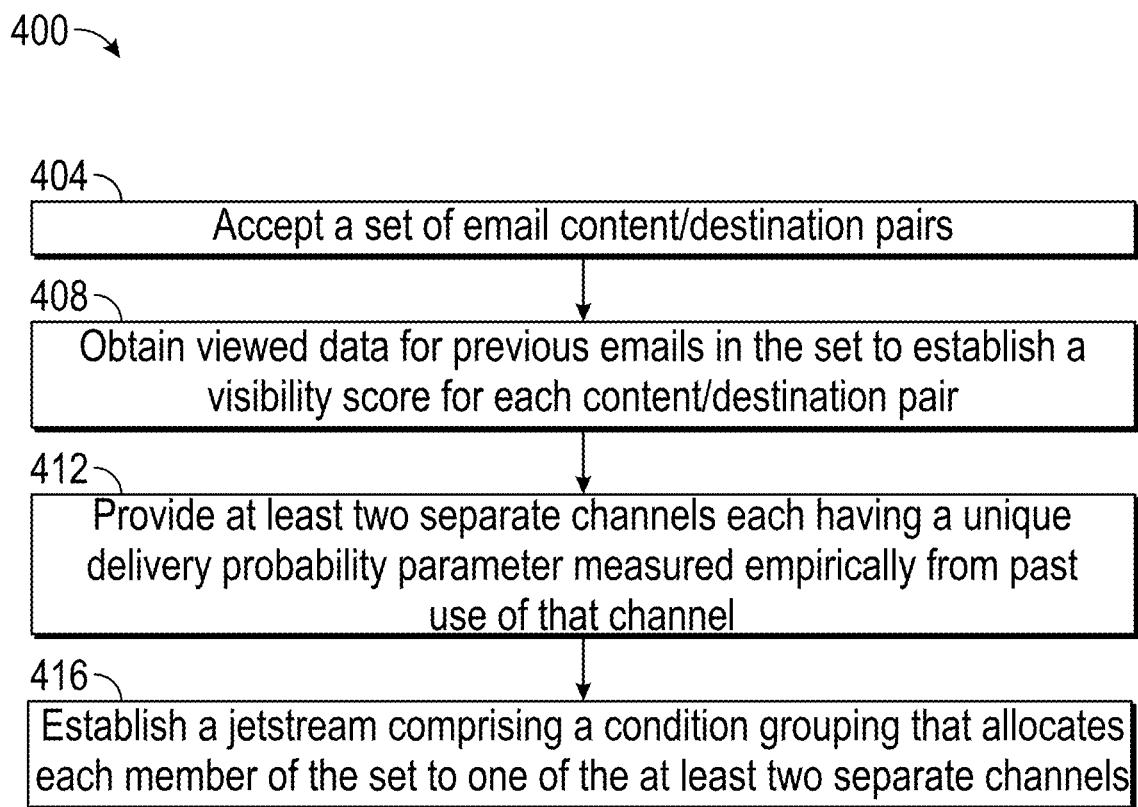
FIG. 4 shows another example method that may be performed by a system described herein to enhance email flow using a filter prediction server.

FIG. 4 shows another example method 400 that may be performed by a system described herein to enhance email flow using a filter prediction server. At block 404 the system can accept a set of email content/destination pairs from a source. The content/destination pairs can include reference to the content of a message (e.g., email) and a corresponding target destination of the message. At block 408 the system can obtain from the destinations viewed data for previous emails in the set to establish a visibility score for each content/destination pair. Obtaining previous viewed data can include obtaining the most recent available viewed data for each destination in the set. The viewed data may correspond to a subset of engagement data described elsewhere herein. For example, viewed data may correspond to opened and/or clicked emails.

At block 412 the system can provide at least two separate channels. Each channel can have a unique engagement probability parameter measured empirically from past use of that channel. The probability parameter may correspond to an engagement or reputation score associated with the emails sent from that channel. A first channel may have a higher engagement probability parameter. A second channel can have a lower engagement probability parameter. The system may determine a difference between these engagement probability parameters. The difference can describe an engagement probability parameter distinction. The engagement probability parameter may comprise (e.g., factor into) a reputation score, such as one described herein.

At block 416, the system may use a filter prediction server to establish a jetstream or transport configuration. The jetstream can include a condition grouping that allocates each member of the set of content/destination pairs to one of the at least two separate channels. The condition group may include a content category condition, such as one described herein. The condition grouping may include a separation condition for visibility data such that email content/destination pairs having visibility data above that threshold are forwarded through the first channel and email content/destination pairs having visibility data below that threshold are forwarded through the second channel. This discrimination may have a benefit of increasing or maintaining the engagement probability parameter distinction between the first and second channels, particularly as more emails are forwarded through the corresponding channel. The content category condition may be configured to account for an estimated reputational algorithm assigned by the destinations downstream from the filter prediction server. The visibility data may include (e.g., factor into) an engagement or affinity score In some embodiments, the condition grouping includes establishing a default channel for each content/destination pair. Which pairs are forwarded through default channel may be based on saved information about the source.

Using a filter prediction server described above can be used to send through a higher reputation channel content/destination pairs predicted to pass through a filter and send through a lower reputation channel content/destination pairs predicted to be rerouted by a filter. This discrimination can allow a source to improve its engagement rates for content/destination pairs having higher engagement probability parameters by avoiding filter association between all content/destination pairs from that source.

Figure 5:
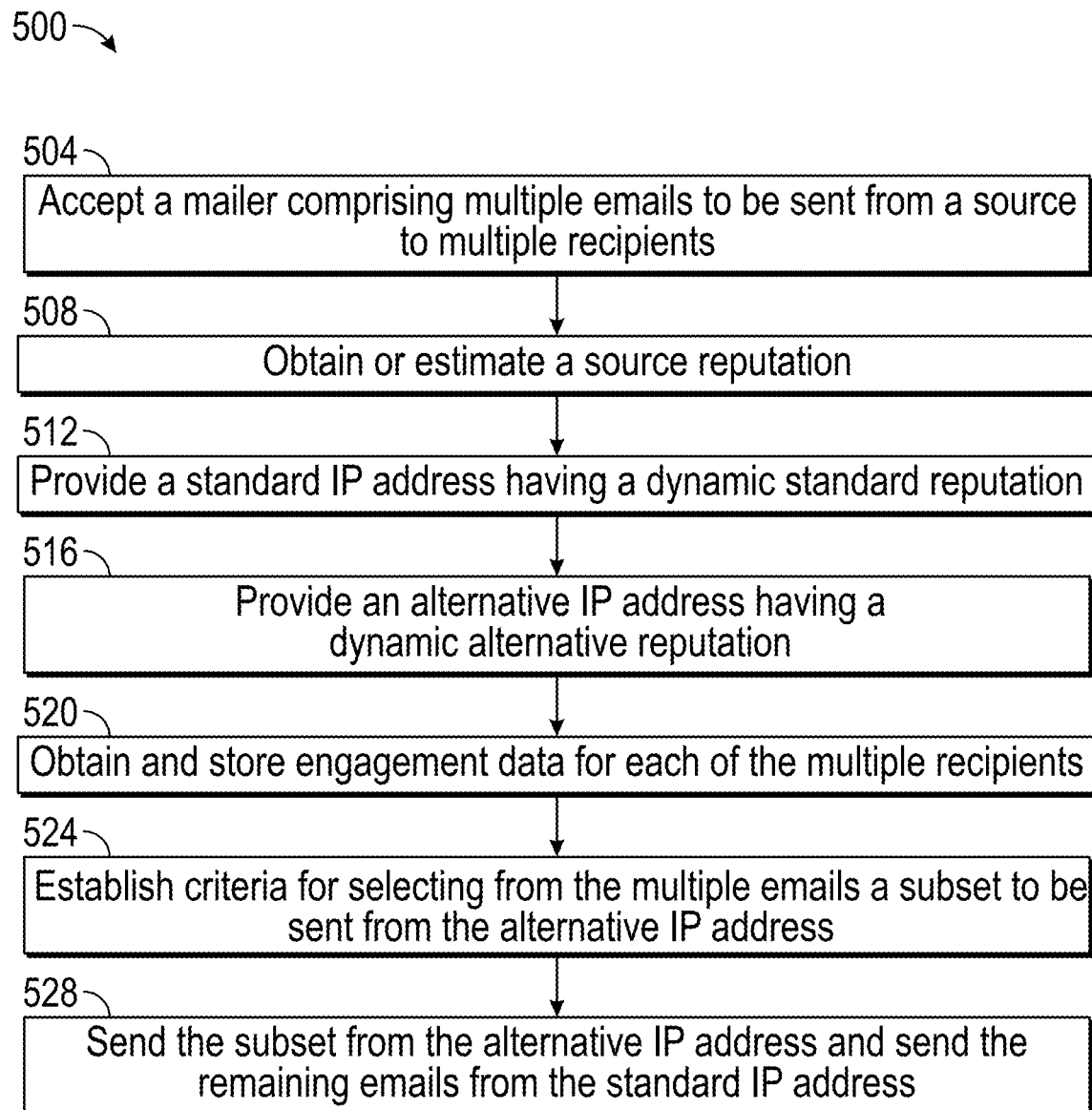
FIG. 5 shows another example method that may be performed by a system described herein to temporarily use internet IP Addresses based on reputations to improve email flow.

FIG. 5 shows another example method 500 that may be performed by a system described herein to temporarily use internet IP Addresses based on reputations to improve email flow. The method 500 can include at block 504 accepting a mailer that includes multiple emails to be sent from a source to multiple recipients. The multiple emails can include content within a particular category (e.g., selected by a user, automatically determined by the system). At block 508 the system may obtaining or estimating a source reputation.

The system at block 512 may provide as a default a standard IP address for the source. The standard IP address may have a dynamic standard reputation. At block 516 the system can provide an alternative IP address having a dynamic alternative reputation. For example, the standard and/or alternative reputations may be changed based on future emails transmitted using a corresponding IP address.

At block 520 the system may obtain and store engagement data for each of the multiple recipients. At block 524 the system can establish criteria for selecting from the multiple emails a subset to be sent from the alternative IP Address. The subset selected (e.g., by a user, automatically) to achieve a higher reputational effect. The criteria may include any criteria described herein, such as a threshold engagement rate for the intended recipients and/or a content category (e.g., associated with the email). Additionally or alternatively, the criteria can include the source reputation as obtained from an external source. At block 528 the system can send the subset from the alternative IP address the remaining emails from the standard IP address.

Additionally or alternatively, the system may avoid a reduction in the alternative IP address reputation by excluding from the subset emails having disfavored content categories and/or excluding from the subset recipients having lower engagement. The system may improve alternative IP address reputation by including in the subset emails having favored content categories and/or including in the subset recipients having higher engagement. The criteria for selecting from the multiple emails a subset to be sent from the alternative IP address can include the source reputation as obtained from an external source.

Figure 6:
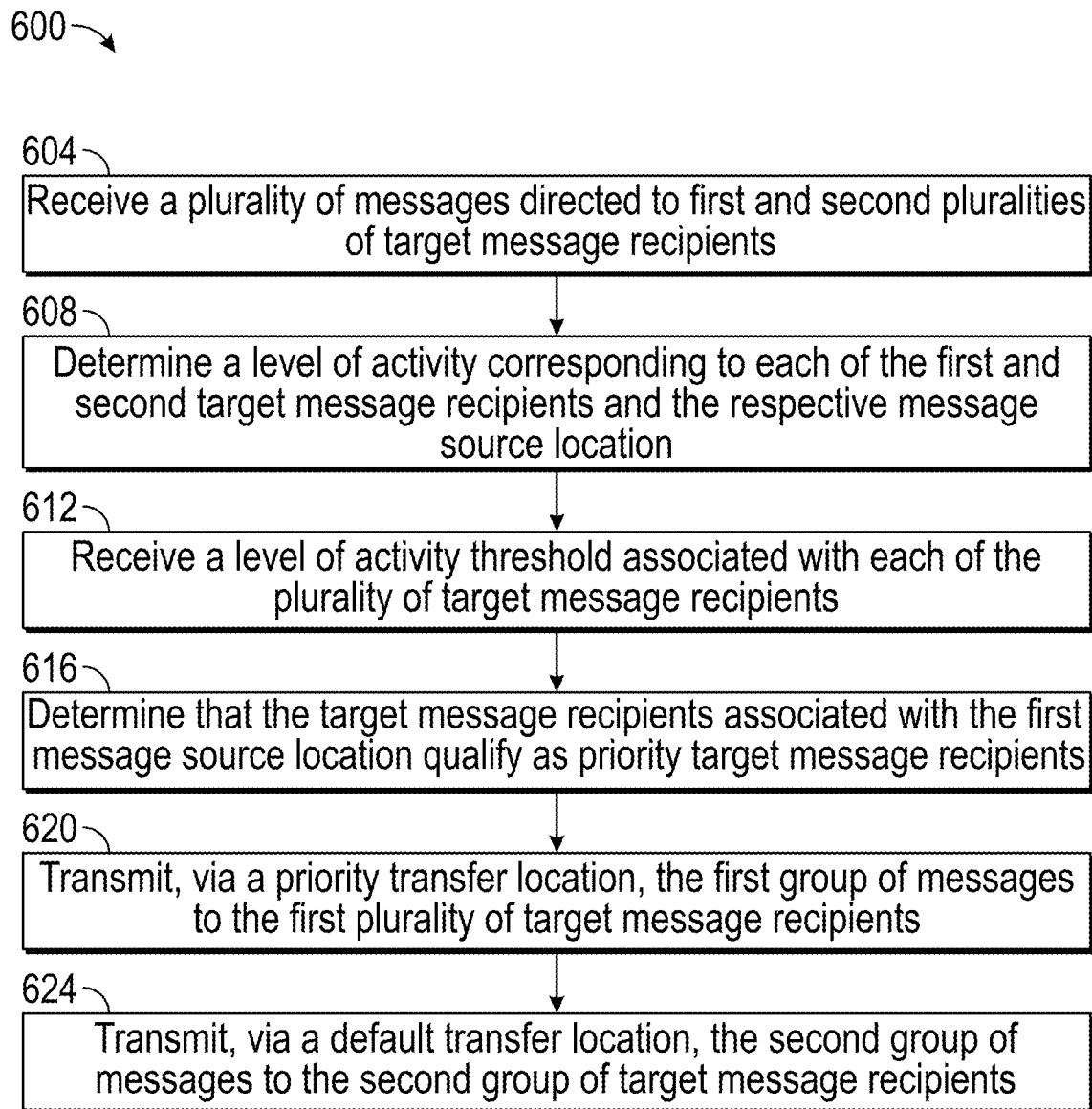
FIG. 6 shows another example method that may be performed by a system described herein.

FIG. 6 shows another example method 600 that may be performed by a system described herein. At block 604 the system may receive from first and second message source locations a plurality of messages directed to first and second pluralities of target message recipients. At block 608 the system can determine a level of activity corresponding to each of the first and second target message recipients and the respective message source location. The determination may be based on the corresponding message source location and on the first and second plurality of target message recipients. At block 612 the system may receive (e.g., via a user interface) a level of activity threshold associated with each of the plurality of target message recipients. Determining each of the levels of activity can include determining that the level of activity is within the level of activity threshold for each of the plurality of target message recipients.

At block 616 the system can determine that the target message recipients associated with the first message source location qualify as priority target message recipients. This determination may be based on each of the levels of activity and/or on the level of activity threshold. At block 620 the system may transmit, via a priority transfer location, the first group of messages to the first plurality of target message recipients. At block 624 the system can transmit, via a default transfer location different from the priority transfer location, the second group of messages to the second group of target message recipients. The first and second pluralities of message recipients do not include any common target message recipients with each other. By separating which messages are sent via which transfer location, a user can improve a message's chances of being received and/or being engaged with.

Figure 7:
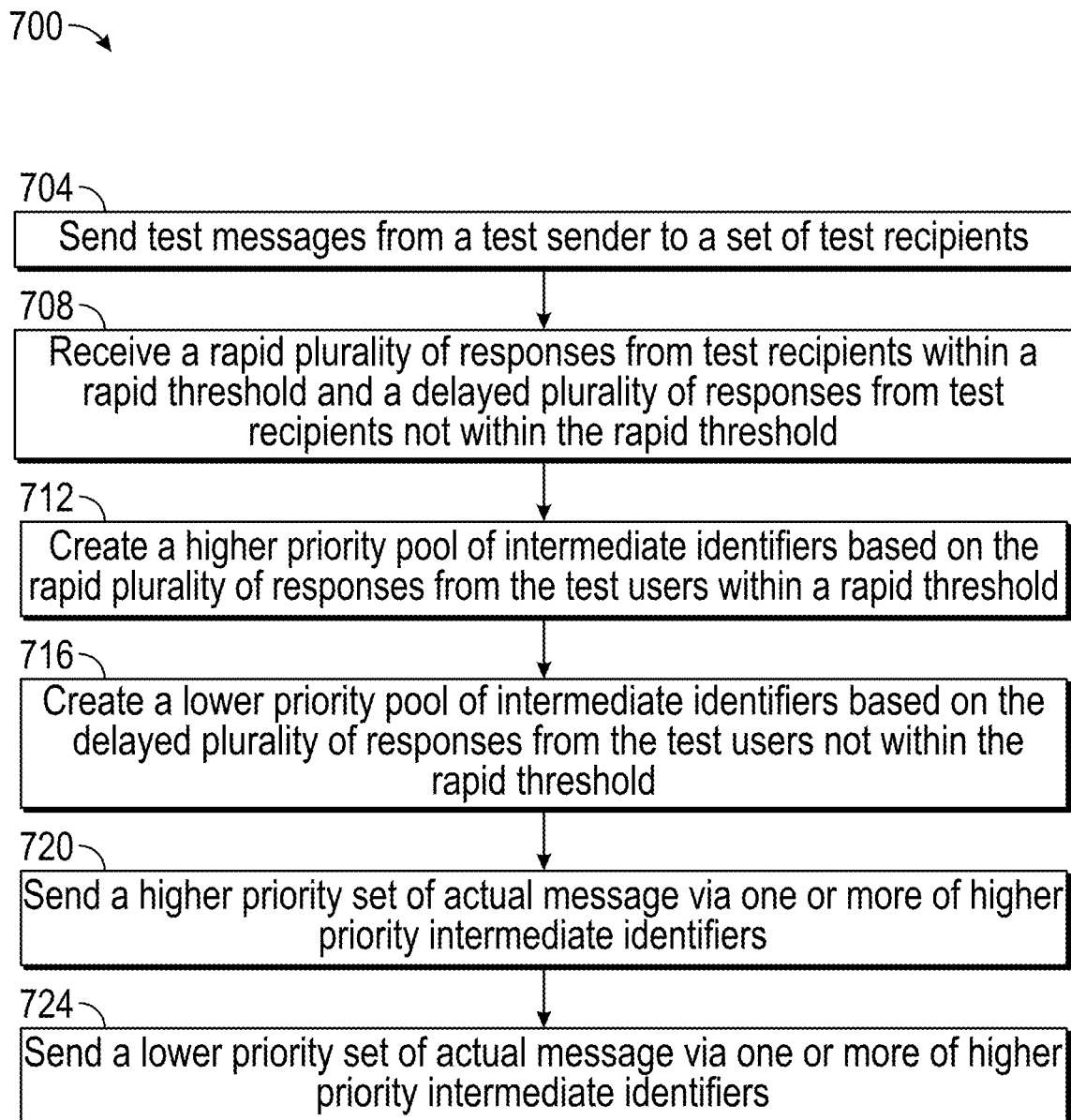
FIG. 7 shows another example method that may be performed by a system described herein to prioritize messages using intermediate identifiers.

FIG. 7 shows another example method 700 that may be performed by a system described herein (e.g., a message prioritization system, a message transportation management system) to prioritize messages using intermediate identifiers. At block 704 the system can send test messages from a test sender to a set of test recipients. Each test message may include a message marker (e.g., pointer object or other signaling object) that is configured to cause a test recipient thereof to communicate with a computing device of the test sender in response to the test recipient opening a corresponding test message. For example, a pixel marker or hyperlink may be embedded in the email to cause the test recipient to request a download of the pixel or to navigate to the location associated with the hyperlink. In each case, the computing device of the test sender can identify that the email was opened and/or clicked, as applicable.

At block 708 the system can receive a rapid plurality of responses from test recipients within a rapid threshold and a delayed plurality of responses from test recipients not within the rapid threshold. At block 712 the system can create a higher priority pool of intermediate identifiers based on the rapid plurality of responses from the test recipients within a rapid threshold. At block 716 the system can create a lower priority pool of intermediate identifiers based on the delayed plurality of responses from the test recipients not within the rapid threshold.

The system can identify a criteria for the set of test messages and, based on the criteria, send a higher priority set of messages via one or more of higher priority intermediate identifiers at block 720 and send a lower priority set of messages via one or more of higher priority intermediate identifiers at block 724. Additionally or alternatively the system may identify the criteria based on characteristics shared between the test messages sent to the test recipients within the rapid threshold.

The system may provide a set of optional criteria for identification. These optional criteria may be selectable by a user via a user interface. The optional criteria may include message content of the messages, a source identity associated with the source of the messages, message metadata associated with the messages, message length associated with the messages, previously-selected criteria, and/or any other criteria described herein. The user interface can be configured to provide one or more selectors that allow user selection or entry of multiple values for the optional criteria. For example, in some embodiments, the user interface allows a user to select a target pool that includes one of the higher or the lower priority pools of intermediate identifiers. Additionally or alternatively, the user interface may allow a user to select a recency data parameter to establish a threshold for including messages in the higher or lower priority sets of actual messages. The recency data parameter may be configured to include messages based on data from the test recipient responses. For example, the recency data parameter can include a "last opened" selector and/or a "last clicked" selector, as described above. In some embodiments, the user interface allows a user to select at least one category corresponding to a topic of the higher and lower priority sets of messages.

The system may be able to track effectiveness of its filter prediction using the message prioritization described above. For example, the system may include in each message in the higher and lower priority sets of messages a signaling object that is configured to cause recipients to communicate with the computing device of the test sender in response to a user opening a corresponding message. The system may then use feedback from the signaling objects to compare user response speed for the test messages to test recipients versus user response speed for the messages to the test recipients, thereby determining a success metric of the identified criteria. In this way, the system may help a user identify trends in the engagement and/or response rates of an end user based on the use of one of the systems described herein. The system may further improve its predictive function by performing a second iteration (or more iterations), using the higher and lower priority sets of actual messages as test messages in the second iteration to further increase a reputation difference between the higher and lower priority pools of intermediate identifiers. Such an increase in reputation difference can provide greater trust in the effectiveness of the higher priority pools of intermediate identifiers in increasing the likelihood of improved end user engagement associated with a message.

EXAMPLES

Below are a list of nonlimiting example embodiments of the description above.

In a 1st Example, a method of enhancing email flow using a filter prediction server includes: accepting, from a source, a set of email content/destination pairs; obtaining, from the destinations, viewed data for previous emails in the set to establish a visibility score for each content/destination pair; providing at least two separate channels, each having a unique engagement probability parameter measured empirically from past use of that channel, a first channel having a higher engagement probability parameter and a second channel having a lower engagement probability parameter, a difference between these engagement probability parameters comprising an engagement probability parameter distinction; using the filter prediction server to establish a jetstream comprising a condition grouping that allocates each member of the set to one of the at least two separate channels, the condition grouping comprising at least a separation condition for visibility data such that email content/destination pairs having visibility data above that threshold are forwarded through the first channel and email content/destination pairs having visibility data below that threshold are forwarded through the second channel, thereby increasing or maintaining the engagement probability parameter distinction between the first and second channels.

In a 2nd Example, the method of Example 1, wherein obtaining previous viewed data comprises obtaining the most recent available viewed data for each destination in the set.

In a 3rd Example, the method of any of Examples 1-2, wherein the condition grouping further comprises a content category condition.

In a 4th Example, the method of Example 3, wherein the content category condition is configured to account for an estimated reputational algorithm assigned by the destinations downstream from the filter prediction server.

In a 5th Example, the method of any of Examples 1-4, wherein the condition grouping further comprises establishing a default channel for each content/destination pair, based on saved information about the source.

In a 6th Example, the method of any of Examples 1-5, wherein the engagement probability parameter factors into or comprises a reputation score.

In a 7th Example, the method of any of Examples 1-6, wherein visibility data factors into or comprises an engagement or affinity score.

In a 8th Example, the method of any of Examples 1-7, further comprising using the filter prediction server to send through a higher reputation channel content/destination pairs predicted to pass through a filter and send through a lower reputation channel content/destination pairs predicted to be rerouted by a filter, thereby allowing a source to improve its engagement rates for content/destination pairs having higher engagement probability parameters by avoiding filter association between all content/destination pairs from that source.

In a 9th Example, a system for improving email delivery comprises: a processor and memory configured to accept incoming mailer requests from a large group of email source domains, each mailer request comprising content and list of intended recipients; a jetstream server configured to administer a set of intermediate domains, each configured as a default intermediate domain for at least one source domain and configurable as a temporary intermediate domain for any other source domain, each intermediate domain comprising a set of IP addresses; the processor and memory further configured to periodically accept and store a reputation score for each of the following: each source domain; each intermediate domain; and each IP address from each intermediate domain; the processor and memory further configured to maintain end-user engagement data for recipients of past emails from the large group of email source domains; a user interface configured to allow a user to establish jetstream instructions for the processor and memory by, for a given set of incoming mailer requests, designating different subsets of emails to be sent using the default and temporary email domains based on: the user engagement data of the intended recipients; the reputation of the source domain; and a content category of each email.

In a 10th Example, the system of Example 9, wherein the intermediate domains are configured to appear in the SMTP From field of emails delivered to recipients.

In a 11th Example, a method of using the system of any of Examples 9-10, comprising using a jetstream to warm up a new source domain by: during a first time period, sending a majority of email traffic from a new source domain through a temporary intermediate domain having a previously-established reputation higher than a threshold; and during the first time period, limiting an initial number of sent emails and incrementally increasing the limit per time period (for at least four time periods/days).

In a 12th Example, a method of temporarily using IP addresses based on reputations to improve email flow, the method comprising: accepting a mailer comprising multiple emails to be sent from a source to multiple recipients, the multiple emails comprising content within a category; obtaining or estimating a source reputation; providing as a default, a standard IP address for the source, the standard IP address having a dynamic standard reputation; providing an alternative IP address having a dynamic alternative reputation; obtaining and storing engagement data for each of the multiple recipients; establishing criteria for selecting from the multiple emails a subset to be sent from the alternative IP address, the subset selected for a higher reputational effect, the criteria comprising: a threshold engagement rate for the multiple recipients, and a content category; sending the subset from the alternative IP address; and sending the remaining emails from the standard IP address.

In a 13th Example, the method of Example 12, further comprising avoiding a reduction in the alternative IP address reputation by excluding emails having disfavored content categories and excluding recipients having lower engagement.

In a 14th Example, the method of any of Examples 12-13, further comprising improving alternative IP address reputation by including emails having favored content categories or including recipients having higher engagement.

In a 15th Example, the method of any of Examples 12-14, wherein criteria for selecting from the multiple emails a subset to be sent from the alternative IP address further comprises the source reputation as obtained from an external source.

In a 16th Example, a message transportation management system configured to determine that a first subgroup of target message recipients qualifies as priority target message recipients, the system comprising: a computer readable storage medium having program instructions embodied therewith; and one or more hardware processors in communication with the computer readable medium, and configured to execute the computer executable instructions to cause the computer system to: receive, from a message source location, a message directed to a plurality of target message recipients; determine, in response to receiving the message and based on the message source location and on the plurality of target message recipients, a plurality of levels of activity each corresponding to one of the plurality of target message recipients; receive, via a user interface, a level of activity threshold associated with each of the plurality of target message recipients; determine, based on the plurality of levels of activity and on the level of activity threshold, that the first subgroup of target message recipients qualifies as priority target message recipients; transmit, via a priority transfer location, the message to the first subgroup of target message recipients; and transmit, via a default transfer location different from the priority transfer location, the message to a second subgroup of target message recipients, wherein the first and second subgroups do not share any common target message recipients with each other.

In a 17th Example, the computing system of Example 16, wherein the instructions, when executed by the one or more hardware processors are further configured to cause the computer system to: receive, from each of the plurality of target message recipients, an indication of a respective one of the plurality of levels of activity.

In a 18th Example, the computing system of any of Examples 16-17, wherein determining the plurality of levels of activity comprises determining an average level of activity for each of the plurality of target message recipients.

In a 19th Example, the computing system of any of Examples 16-18, wherein determining the plurality of levels of activity comprises determining a level of activity within the level of activity threshold for each of the plurality of target message recipients.

In a 20th Example, the computing system of Example 19, wherein determining the level of activity within the level of activity threshold for each of the plurality of target message recipients comprises determining, for each of the plurality of target message recipients, whether the target message recipient has opened a message from either the message source location, the priority transfer location, or the default transfer location.

In a 21st Example, the computing system of any of Examples 19-20, wherein determining the level of activity within the level of activity threshold for each of the plurality of target message recipients comprises determining, for each of the plurality of target message recipients, whether the target message recipient has clicked on a message from either the message source location, the priority transfer location, or the default transfer location.

In a 22nd Example, the computing system of any of Examples 16-21, wherein determining the plurality of levels of activity comprises determining a category for each of the plurality of target message recipients.

In a 23rd Example, the computing system of Example 22, wherein determining the category for each of the plurality of target message recipients is based at least in part on, for each of the plurality of target message recipients, a level of activity associated with messages related to the category.

In a 24th Example, the computing system of any of Examples 16-23, wherein: receiving the message comprises receiving a plurality of messages; and determining that the first subgroup of target message recipients qualifies as priority target message recipients is further based on a number of the plurality of messages.

In a 25th Example, the computing system of any of Examples 16-24, wherein the instructions, when executed by the one or more hardware processors are further configured to cause the computer system to: modify the message by embedding a message marker into the message; and in response to the message being opened, receive an indication that the message is being opened.

In a 26th Example, the computing system of Example 25, wherein the instructions, when executed by the one or more hardware processors are further configured to cause the computer system to: in response to user selection of the message marker, receive an indication of the user selection of the message marker.

In a 27th Example, the computing system of any of Examples 16-26, wherein the instructions, when executed by the one or more hardware processors are further configured to cause the computer system to: determine an affinity score associated with the plurality of target message recipients.

In a 28th Example, the computing system of Example 27, wherein determining the affinity score associated with the plurality of target message recipients comprises determining individual affinity scores associated with each of the plurality of target message recipients.

In a 29th Example, the computing system of any of Examples 27-28, wherein determining the affinity score associated with the plurality of target message recipients is based at least on the message source location and on the plurality of target message recipients.

In a 30th Example, the computing system of any of Examples 16-29, wherein the instructions, when executed by the one or more hardware processors are further configured to cause the computer system to: receive, via the user interface, one or more message recipient identifiers, wherein transmission of the message to at least one of the first or second subgroup of target message recipients is based at least in part on the one or more message recipient identifiers.

In a 31st Example, a computing system comprising: a computer readable storage medium having program instructions embodied therewith; and one or more hardware processors in communication with the computer readable medium, and configured to execute the computer executable instructions to cause the computer system to: receive, from first and second message source locations, a plurality of messages directed to first and second pluralities of target message recipients; determine, in response to receiving the plurality of messages and based on the corresponding message source location and on the first and second plurality of target message recipients, a level of activity corresponding to each of the first and second target message recipients and the respective message source location; receive, via a user interface, a level of activity threshold associated with each of the plurality of target message recipients, wherein determining each of the levels of activity comprises determining that the level of activity is within the level of activity threshold for each of the plurality of target message recipients; determine, based on each of the levels of activity and on the level of activity threshold, that the target message recipients associated with the first message source location qualify as priority target message recipients; transmit, via a priority transfer location, the first group of messages to the first plurality of target message recipients; and transmit, via a default transfer location different from the priority transfer location, the second group of messages to the second group of target message recipients, wherein the first and second pluralities of message recipients do not include any common target message recipients with each other.

In a 32nd Example, the computing system of Example 31, wherein the instructions, when executed by the one or more hardware processors are further configured to cause the computer system to: receive, via the user interface, a selection of a message source location to either include in or exclude from the first and second message source locations.

In a 33rd Example, a message prioritization system using intermediate identifiers, the system comprising: an electronic database configured to store empirical recency data comprising rapid and delayed pluralities of responses from test recipient; a hardware processor configured to execute software instructions, the software instructions causing the hardware processor to: send test messages from a test sender to a set of test recipients, each test message having a pointer object configured to cause a test recipient thereof to communicate with a computing device of the test sender in response to the test recipient opening a corresponding test message; receive a rapid plurality of responses from test recipients within a rapid threshold and a delayed plurality of responses from test recipients not within the rapid threshold; create a higher priority pool of intermediate identifiers based on the rapid plurality of responses from the test recipients within a rapid threshold; create a lower priority pool of intermediate identifiers based on the delayed plurality of responses from the test recipients not within the rapid threshold; identify a criteria for the set of test messages; based on the criteria, sending a higher priority set of messages via one or more of higher priority intermediate identifiers; and based on the criteria, sending a lower priority set of messages via one or more of higher priority intermediate identifiers.

In a 34th Example, the message prioritization system of Example 33, wherein the software instructions cause the hardware processor to identify the criteria based on characteristics shared between the test messages sent to the test recipients within the rapid threshold.

In a 35th Example, the message prioritization system of any of Examples 33-34, wherein the software instructions cause the hardware processor to provide a set of optional criteria for identification, the set comprising one or more of the following: message content of the messages; source identity associated with the source of the messages; message metadata associated with the messages; message length associated with the messages; and previously-selected criteria.

In a 36th Example, the message prioritization system of Example 35, further comprising a user interface configured to provide one or more selectors configured to allow user selection or entry of multiple values for at least one of the optional criteria from the set.

In a 37th Example, the message prioritization system of Example 36, wherein the user interface allows a user to select a target pool, the target pool comprising one of the higher or the lower priority pools of intermediate identifiers.

In a 38th Example, the message prioritization system of any of Examples 36-37, wherein the user interface allows a user to select a recency data parameter to establish a threshold for including messages in the higher or lower priority sets of actual messages, the recency data parameter configured to include messages based on data from the test recipient responses.

In a 39th Example, the message prioritization system of Example 38, wherein the recency data parameter comprises at least one of a "last opened" selector and a "last clicked" selector.

In a 40th Example, the message prioritization system of any of Examples 36-39, wherein the user interface allows a user to select at least one category corresponding to a topic of the higher and lower priority sets of messages.

In a 41st Example, a filter prediction and learning system comprising the message prioritization system of any of Examples 33-40 and a feedback evaluation module, wherein the software instructions are further configured to cause the hardware processor to: include in each message in the higher and lower priority sets of messages a signaling object configured to cause recipients to communicate with the computing device of the test sender in response to a user opening a corresponding message; and use feedback from the signaling objects to compare user response speed for the test messages to test recipients versus user response speed for the messages to the test recipients, thereby determining a success metric of the identified criteria.

In a 42nd Example, a method of using the message prioritization system of any of Examples 33-41 to improve predictive function of two intermediate identifiers by further using the software instructions to cause the hardware processor to perform a second iteration, using the higher and priority sets of actual messages as test messages in the second iteration to further increase a reputation difference between the higher and lower priority pools of intermediate identifiers.

Additional Implementation Details

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
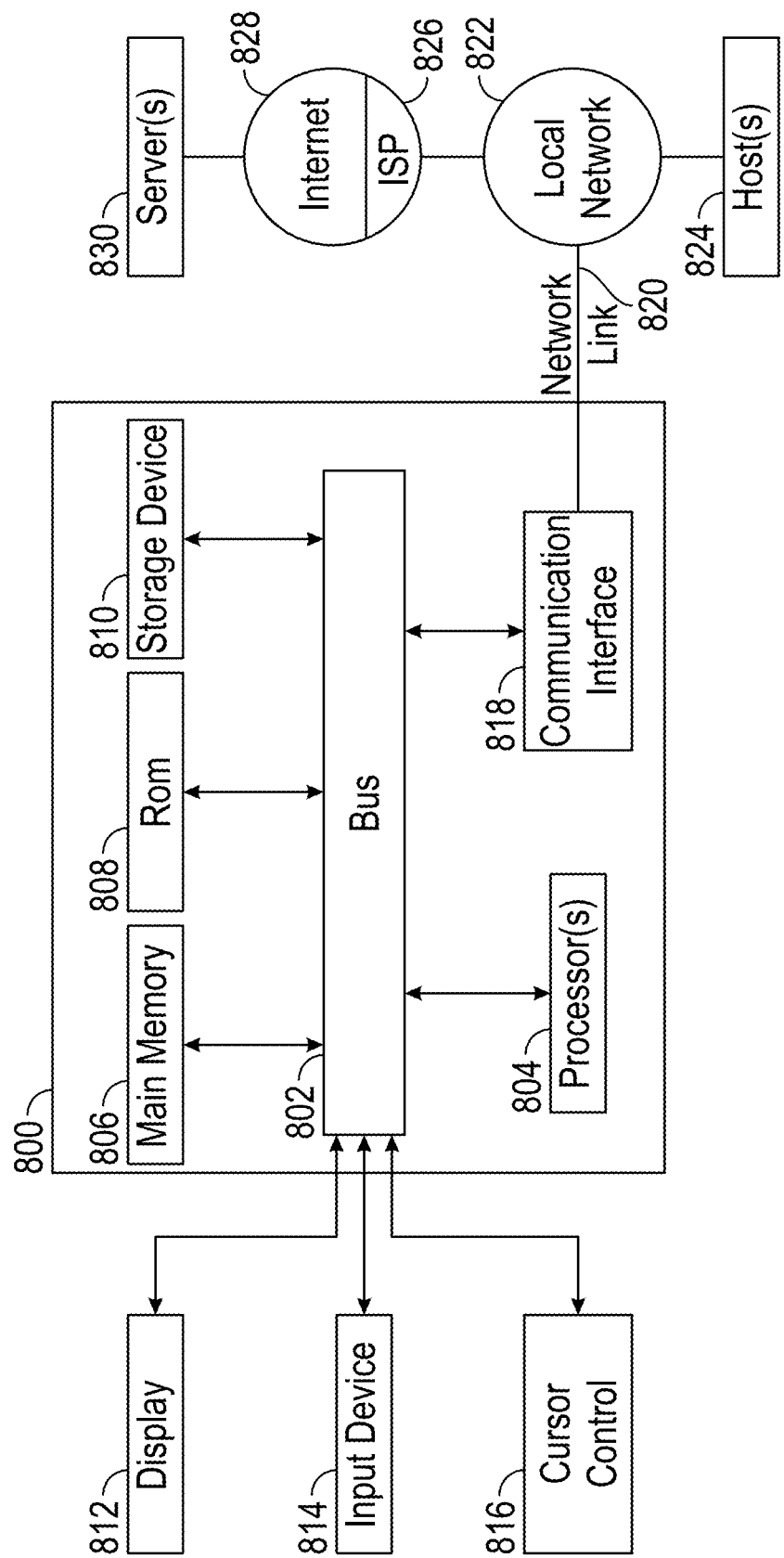
FIG. 8 is a block diagram illustrating one example of a computer system upon which various embodiments may be implemented.

For example, FIG. 8 is a block diagram that illustrates a computer system 800 upon which various embodiments may be implemented. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as computer executable program instructions that are executed by the computing device(s). Computer system 800 may further, as described below, implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of enhancing email flow using a filter prediction server, the method comprising:
    providing at least two separate channels, a first channel having a higher engagement probability parameter and a second channel having a lower engagement probability parameter, a difference between these engagement probability parameters comprising an engagement difference; and
    using the filter prediction server to establish a jetstream comprising a condition grouping that allocates each member of a set of email content/destination pairs to one of the at least two separate channels, the condition grouping comprising at least a separation threshold for visibility data such that email content/destination pairs having visibility data above that threshold are forwarded through the first channel and email content/destination pairs having visibility data below that threshold are forwarded through the second channel, thereby increasing or maintaining the engagement difference between the first and second channels.

2. The method of claim 1, wherein the condition grouping further comprises a content category condition.

3. The method of claim 2, wherein the content category condition is configured to account for a reputational algorithm applied downstream from the filter prediction server.

4. The method of claim 1, wherein the condition grouping further comprises establishing a default channel for each content/destination pair, based on saved information about a source of the email content/destination pairs.

5. The method of claim 1, further comprising using the filter prediction server to send through a higher reputation channel content/destination pairs predicted to pass through a filter and send through a lower reputation channel content/destination pairs predicted to be rerouted by a filter, thereby allowing a source to improve its engagement rates for content/destination pairs having higher engagement probability parameters by avoiding filter association between all content/destination pairs from that source.

6. A system for improving email delivery, the system comprising:
    a jetstream server configured to administer a set of intermediate domains, each configured as a default intermediate domain for at least one source domain and configurable as a temporary intermediate domain for any other source domain, each intermediate domain comprising a set of IP addresses;
    a processor and memory further configured to store a reputation score for at least one of the following:
        each source domain;
        each intermediate domain; or
        each IP address from each intermediate domain;
    the processor and memory further configured to maintain end-user engagement data for recipients of past emails from a large group of email source domains, thereby increasing or maintaining a reputation score difference between the default and temporary intermediate domains; and
    a user interface configured to allow a user to establish jetstream instructions for the processor and memory by, for a given set of incoming mailer requests, designating different subsets of emails to be sent using the default and temporary email domains based on at least one of:
        the user engagement data of intended recipients;
        the reputation of the source domain; or
        a content category of each email.

7. The system of claim 6, wherein the intermediate domains are configured to appear in an SMTP From field of emails delivered to recipients.

8. A method of using the system of claim 6, the method comprising:
    accepting the incoming mailer requests, wherein the content is within a category;
    obtaining or estimating the reputation score for a source domain;
    providing, from the intermediate domains comprising sets of IP addresses, a standard IP address for the source domain, the standard IP address comprising the default intermediate domain and having a dynamic standard reputation;
    providing, from the intermediate domains comprising sets of IP addresses, an alternative IP address comprising the temporary intermediate domain and having a dynamic alternative reputation;
    obtaining and storing engagement data for the recipients of past emails;
    using the user interface to establish criteria for selecting from multiple emails a subset to be sent from the alternative IP address, the subset selected for a higher reputational effect, the criteria comprising:
        a threshold engagement rate for the intended recipients, and
        a content category;
    sending the subset from the alternative IP address; and
    sending any remaining emails from the standard IP address.

9. The method of claim 8, further comprising avoiding a reduction in the alternative IP address reputation by excluding from the subset emails having disfavored content categories and excluding from the subset recipients having lower engagement.

10. The method of claim 8, further comprising improving alternative IP address reputation by including in the subset emails having favored content categories or including in the subset recipients having higher engagement.

11. A message and email transportation management system configured to determine that a first subgroup of target message recipients qualifies as priority target message recipients, the system comprising:
- a computer readable storage medium having program instructions embodied therewith; and
- one or more hardware processors in communication with the computer readable medium, and configured to execute the computer executable instructions to cause the computer system to:
  - receive, via a user interface, a level of activity threshold corresponding to a reputation score, the level of activity threshold associated with each of a plurality of target message recipients;
  - determine, based on the plurality of levels of activity and on the level of activity threshold, that the first subgroup of target message recipients qualifies as priority target message recipients;
  - transmit, via a priority transfer location for emails, the message to the first subgroup of target message recipients; and
  - transmit, via a default transfer location different from the priority transfer location, the message to a second subgroup of target message recipients, thereby increasing or maintaining a difference in reputation scores between the default and priority transfer locations.

12. The system of claim 11, wherein the instructions, when executed by the one or more hardware processors are further configured to cause the computer system to:
- receive, from each of the plurality of target message recipients, an indication of a respective one of the plurality of levels of activity.

13. The system of claim 11, wherein determining the plurality of levels of activity comprises determining an average level of activity for each of the plurality of target message recipients.

14. The system of claim 11, wherein determining the plurality of levels of activity comprises determining a level of activity within the level of activity threshold for each of the plurality of target message recipients.

15. The system of claim 14, wherein determining the level of activity within the level of activity threshold for each of the plurality of target message recipients comprises determining, for each of the plurality of target message recipients, whether the target message recipient has opened a message from either a message source location, the priority transfer location, or the default transfer location.

16. The system of claim 14, wherein determining the level of activity within the level of activity threshold for each of the plurality of target message recipients comprises determining, for each of the plurality of target message recipients, whether the target message recipient has clicked on a message from either a message source location, the priority transfer location, or the default transfer location.

17. The system of claim 11, wherein determining the plurality of levels of activity comprises determining a category for each of the plurality of target message recipients, wherein determining the category for each of the plurality of target message recipients is based at least in part on, for each of the plurality of target message recipients, a level of activity associated with messages related to the category.

18. The system of claim 11, wherein:
- receiving the message comprises receiving a plurality of messages; and
- determining that the first subgroup of target message recipients qualifies as priority target message recipients is further based on a number of the plurality of messages.

19. The system of claim 11, wherein the instructions, when executed by the one or more hardware processors are further configured to cause the computer system to:
- modify the message by embedding a message marker into the message; and
- in response to the message being opened, receive an indication that the message is being opened.

20. The system of claim 19, wherein the instructions, when executed by the one or more hardware processors are further configured to cause the computer system to:
- in response to user selection of the message marker, receive an indication of the user selection of the message marker.

* * * * *